June 14, 1960

S. A. SCHERBATSKOY 2,940,302

PIPE-LINE EXPLORATION

Filed April 19, 1956

INVENTOR.
Serge A. Scherbatskoy
By Dowis, McDougall, Hiebsch
& Hersh,
Attorneys

INVENTOR.
Serge A. Scherbatskoy
By Dowis McDougall, Williams
+ Hersh,
Attorneys

June 14, 1960  S. A. SCHERBATSKOY  2,940,302
PIPE-LINE EXPLORATION

Filed April 19, 1956  7 Sheets-Sheet 5

INVENTOR.
Serge A. Scherbatskoy
By Dows, McDougal,
Williams + Hersh,
Attorneys

June 14, 1960  S. A. SCHERBATSKOY  2,940,302
PIPE-LINE EXPLORATION

Filed April 19, 1956  7 Sheets-Sheet 7

INVENTOR.
Serge A. Scherbatskoy
By Dows, McDougall,
Williams & Hirsch
Attorneys

United States Patent Office 2,940,302
Patented June 14, 1960

2,940,302

PIPE-LINE EXPLORATION

Serge A. Scherbatskoy, 1220 E. 21st Place, Tulsa, Okla.

Filed Apr. 19, 1956, Ser. No. 579,341

5 Claims. (Cl. 73—40.5)

The present invention relates to methods and apparatus for performing various measurements in tubular structures such as pipe lines, and more particularly pertains to methods and apparatus for determining the extent of corrosion and for finding leaks in buried pipe lines.

This application is a continuation-in-part of my copending application, Serial No. 482,240, entitled "Pipeline Exploration," filed January 17, 1955.

It is an object of the present invention to provide a method and apparatus by which a buried pipe line may be internally explored and the existence and location of leaks determined.

Another object of the invention is to provide a method and apparatus by which areas of pipe corrosion can be discovered and located, and hence repaired, before actual pipe failures or leaks occur.

Still another object of the present invention is to provide a method and appartus for exploration of buried pipe lines by means of an exploring unit carried through the pipe by the force of the fluid being transported in the line.

A still further object of my invention is to provide a method of pipe-line exploration wherein data concerning the condition of the line and the location of anomalies therein may be transmitted back to an observation station for recording and analysis while the actual exploration of the line is taking place.

Other objects and advantages of my invention will be readily apparent from the following description taken in reference to the attached drawings, wherein.

This invention involves making measurements within the pipe line. The measuring instruments are contained in a suitable exploring housing which is carried within the pipe line by the motion of the fluid and covers within a suitable time interval the entire length of pipe line to be investigated. As the exploring housing travels within the pipe line, one of the measuring instruments responsive to a given physical condition in the immediate neighborhood of the housing produces a signal representing said condition. The other measuring instrument produces signals representing the successive positions of the housing. Hence the second signal permits correlation of the first signal with definite locations along the pipe line, and these two signals properly recorded provide a record representing the variation of a given physical condition or measurement along the pipe line as a function of geographical position therealong. Two different systems for obtaining such a record are herewith disclosed, designated respectively as the "moving recorder system" and the "moving transmitter system."

In the "moving recorder system" I provide within the exploring housing a clock-driven recording means, and the two signals above mentioned are recorded thereby as the housing travels within the pipe line. After the housing has completed its travel along the pipe line, the recording, removed from the housing, provides the record of the measurements made by the exploring unit during its journey.

In the "moving transmitter system" I provide within the exploring housing a signal transmitter, and the two signals mentioned above are applied to the transmitter and thereby transmitted to a receiving station at the end of the pipe line. A record of the measurements made during the travel of the exploring housing can thus be made from the signals picked up at the receiving station.

Figure 1A:
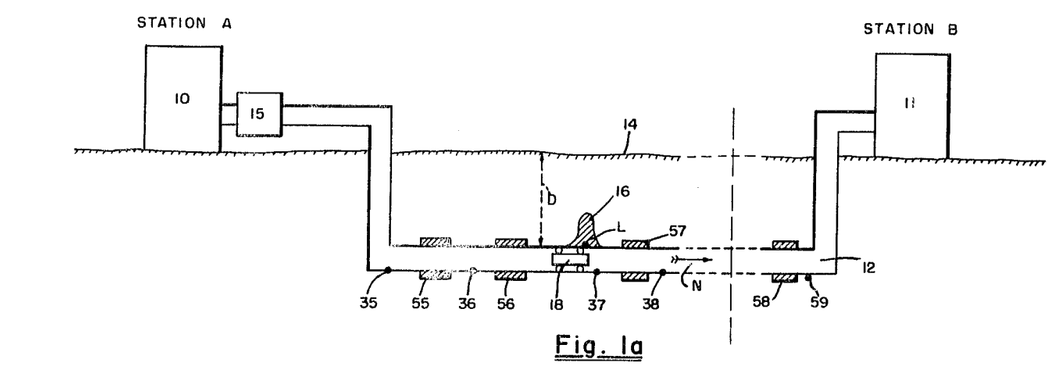
Figure 1a illustrates a pipe line buried below the earth's surface and an appropriate surface equipment for the transmission of fluid from one location to another.

Fig. 1 shows schematically an arrangement for transporting a fluid, which may be gas under pressure or a liquid such as crude oil or gasoline, from a storage tank 10 at a location A to a storage tank 11 at a location B. The two storage tanks are connected by means of a pipe line 12, said pipe line being buried below the earth's surface 14 at a depth D. The transmission of the fluid is effected by means of a pump 15 adjacent the tank 10 which forces the gas or liquid to move in the direction of the arrow N from the tank 10 to the tank 11.

The purpose of my invention is to explore the environment of the pipe line in order to prevent or detect corrosion and in order to prevent or to locate a leak. If a leak occurs in the pipe line at a location designated by L a portion of the fluid flowing in the pipe line will be forced out of the pipe line through the leak and will form an accumulation of fluid 16 in the portion of the soil immediately adjacent point L.

In order to explore the environment of the pipe line so as to detect the corrosion or to detect the occurrence of fluid accumulation such as the one designated by 16, I utilize an exploring instrument 18 which is inserted in the pipe 12 at the outlet of the pump 15 and is adapted to move in the direction of the arrow N from the station A to the station B under the pressure of the moving stream.

Figure 2A:
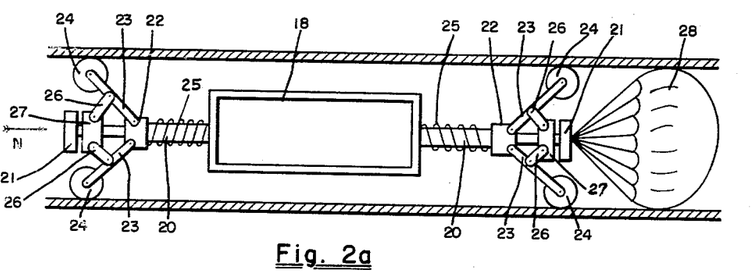
Fig. 2a shows an exploring housing comprising an umbrella-shaped membrane.

The exploring housing 18 as shown in Fig. 2a is provided at each end with a rod 20, having a stop 21. A collar 22 carrying three or more pivotal arms 23 is slidably arranged on each rod 20. Mounted on the outer end of each arm is a roller 24 which is spring-pressed against the casing by a spring 25. Links 26 are pivoted to the arms 23 and to the collar 27. This assembly of elements constitutes a self-adjusting device operative to hold the instrument 18 substantially centered within the pipe line as it travels therethrough.

In order to facilitate movement of the exploring instrument through the pipe line responsively to the force of the fluid, I provide for the instrument an umbrella-shaped membrane 28, connected to the forward end of the exploring unit, as shown in Fig. 2a. The membrane 28 has its external edges pressed against the inside wall of the pipe line and therefore has its surface exposed to substantially the total pressure of the moving fluid. This arrangement is particularly useful in gas pipes or in pipe lines containing moving liquid of a very low viscosity, since the membrane prevents the moving liquid or gas from passing through the space between the external wall of the housing and the internal wall of the pipe line. Without such a device as membrane 28, the pressure on the unit from the gas or low-viscosity liquid might be insufficient to move the unit through the pipe line.

Figure 2B:
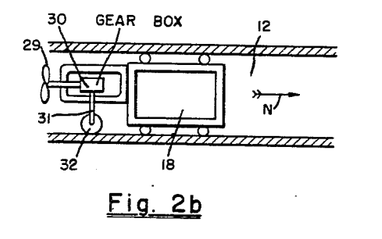
Fig. 2b shows an exploring housing comprising an impeller adapted to rotate under the effect of the pressure of the moving fluid.

Another method of propelling the exploring housing is shown in Fig. 2b. Here the motion of the fluid causes the propeller 29 to rotate and the rotation of the propeller 29 is transmitted by means of an appropriate gear box 30 to rotate a shaft 31 which in turn drives the wheel 32 and thus moves the housing 18.

Figure 2C:
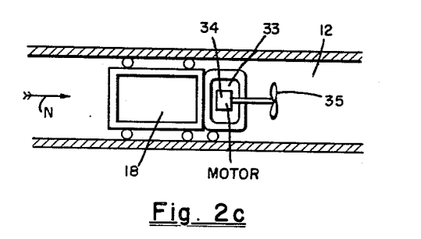
Fig. 2c shows an exploring housing which is adapted to be propelled by a motor-driven propeller.

A third method of propelling the exploring housing is shown in Fig. 2c. In this figure, the housing 18 is attached to a vehicle 33 in which a motor 34 is arranged to rotate the propeller 35. The rotation of the propeller in the fluid within the pipe produces forward motion of the housing 18.

Figure 3A:
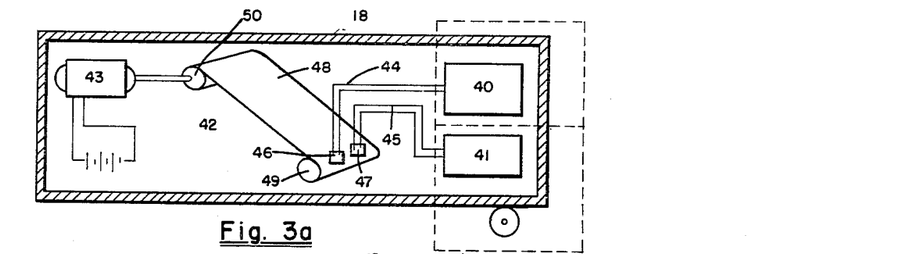
Fig. 3a is a diagrammatic sectional view of an exploring housing of the "moving recorder system."

A type of exploring housing which may be utilized in the "moving recorder system" is shown in Fig. 3a. It consists essentially of two sensing elements 40 and 41 and a magnetic recorder 42 for recording the outputs of the sensing elements; the magnetic recorder being driven by a spring-powered clock 43.

The sensing element 40 shall be designated hereafter as "the exploring element" and is adapted to produce at its output terminals 44 an electrical signal having magnitude representing a certain physical condition prevailing in the immediate neighborhood of the element. This output signal may represent fluid pressure, resistivity of the surrounding medium, intensity of radiation flux, etc.

The sensing element 41 shall be identified hereafter as the "position identifying element" and is adapted to produce across its output leads 45 a signal representing the position of the element 41 with respect to certain reference points along the pipe line. The leads 44 and 45 are respectively connected to magnetic recording heads 46 and 47, said recording heads being adjacent a movable magnetic tape 48 adapted to be wound from the drum 49 onto the drum 50 by the clock mechanism 43.

Figure 3B:
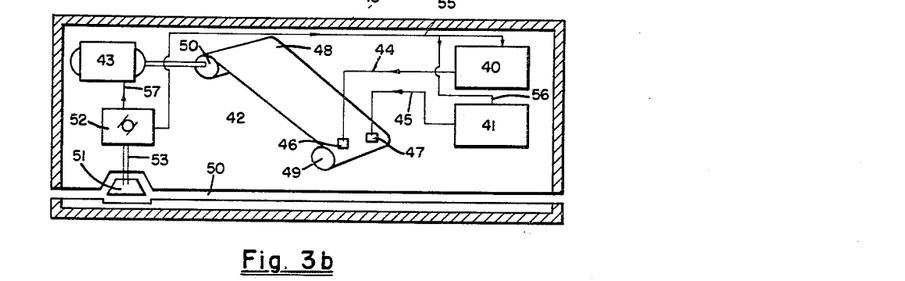
Fig. 3b shows a modification of Fig. 3a in which the various instruments contained in the housing are energized by a turbo-generator driven by the motion of the fluid in the pipe line.

Fig. 3b represents a modified version of Fig. 3a. Similar elements in both figures are designated by the same numerals. I have provided, however, in Fig. 3b a channel 50 which permits a small portion of the fluid within the pipe line 12 to be pumped through said channel and to drive a turbine 51 and the electric generator 52, said generator being mounted on the same shaft 53 as said motor. The generator 53 provides through leads 55x and 56x, respectively, the current required to energize the exploring element 40 and the position identifying element 41. It also provides through the leads 57 an electric current to energize the clock mechanism 43.

It should be noted that in Fig. 3a the leads for conducting electrical current are designated by double lines, while in Fig. 3b they are designated by single lines.

As the exploring housing 18 moves in the pipe line from the station A to the station B, there are recorded upon the movable tape 48 two records, one impressed by the head 47 representing various positions of the exploring housing 18 and the other impressed by the head 46 representing certain physical conditions encountered by the sensing element 40 during the housing's travel.

Figure 4:
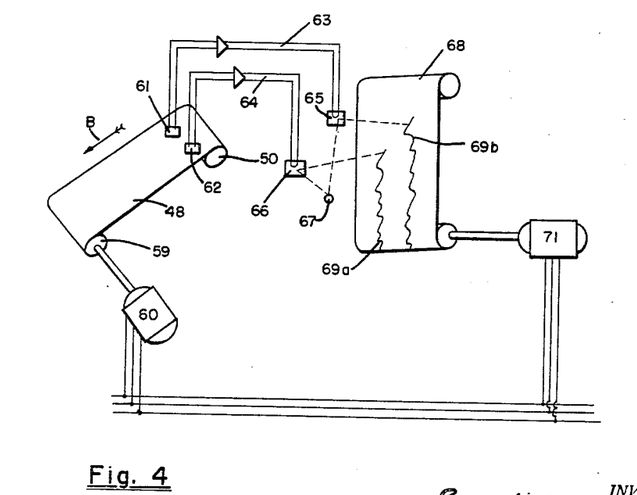
Fig. 4 shows diagrammatically a reproducer of the "moving recorder" system.

After the housing 18 has completed its journey from the station A to the station B, it is withdrawn from the pipe line and the magnetic tape 48 is inserted into a reproducer shown in Fig. 4 for producing a visual record of the output signals from the elements 40 and 41. As shown in Fig. 4, the tape 48 is moved by means of a motor 60 in the direction of the arrow B past the magnetic reproducer heads 61 and 62. The reproducer heads are respectively connected through the channels 63 and 64 to suitable coil-mirror assemblies 65 and 66 mounted to move in the field of a permanent magnet in accordance with the current outputs of the reproducers 61 and 62. The lamp 67 throws beams of light onto the mirrors 65 and 66 which are respectively reflected onto a sensitized film 68 to produce thereon the traces 69a and 69b, respectively representative of the signal outputs of the elements 40 and 41. The film 68 is driven by means of a motor 71 synchronously with the motor 60 and the magnetic tape 48.

Figure 5A:
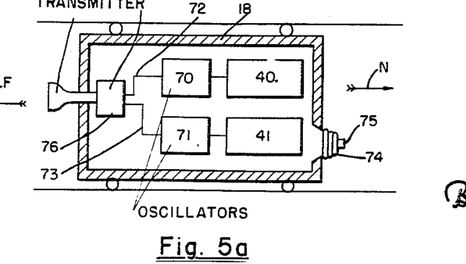
Fig. 5a is a diagrammatic sectional view of an exploring housing of the "moving transmitter" system.
Figure 5B:
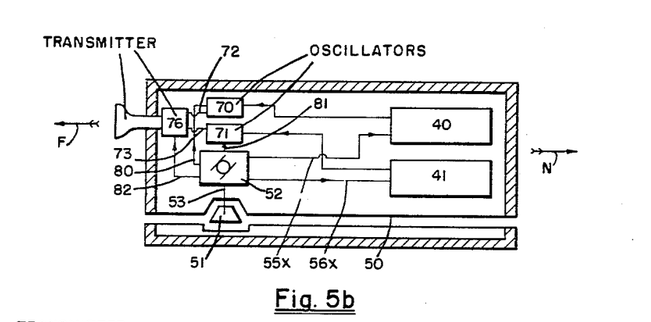
Fig. 5b shows a modification of Fig. 5a in which the various instruments contained in the housing are energized by a turbo-generator driven by the motion of the fluid in the pipe line.

Figs. 5a and 5b show another embodiment of the exploring housing 18 adapted to move within the pipe line 12 in the same manner as the exploring housing shown in Fig. 3a or 3b by any of the means shown in Figs. 2a, 2b, or 2c. The housing as shown in Figs. 5a, 5b does not contain any means for recording the signals produced thereon, and is of the type useful in the "moving transmitter system." The exploring housing of Figs. 5a and 5b have the exploring element 40 and the position identifying element 41 as in the units of Fig. 3a and Fig. 3b. The outputs of these two elements, however, are in this embodiment applied respectively to modulate the outputs of two oscillators 70 and 71. Thus oscillator 70 produces across the output terminals 72 a current having frequency $f_1$, modulated by the output signal of the exploring element 40. Similarly, oscillator 71 produces across the output terminals 73 a current having frequency $f_2$, modulated by the output signal of the position identifying element 41. Obviously, the modulation may be frequency, phase, or amplitude modulation.

The two modulated signals from oscillators 70 and 71 are applied to a transducer 76, which may develop either acoustic or electromagnetic waves. Transducer 76 transmits these waves directionally along the direction of the arrow F through the medium flowing in the pipe line.

In some instances I may provide my exploring housing with a bellows-type spout 74 as shown in Fig. 5a, having a stoppered opening 75 for filling the housing with a liquid such as kerosene. The purpose of the bellows-type spout is to compensate for the pressure differential between the inside and outside of the housing whereby the walls need not have sufficient mechanical strength to withstand the pressure within the pipe line.

The embodiment of Fig. 5b differs from the one shown in Fig. 5a in the same manner as the embodiment of Fig. 3b differs from the one in Fig. 3a. Briefly, the exploring housing shown in Fig. 5b is provided with a channel 50 for the passage of the fluid within the pipe line 12. As the fluid passes through this channel, it drives a turbine 51 and the electric generator 52, said generator being mounted on the same shaft 53 as said turbine. The generator 53 provides through the leads 55 and 56, respectively, the electrical current to energize the exploring element 40 and the position identifying element 41. It also provides through the leads 80, 81, and 82 electrical current to energize the oscillators 70, 71 and the transducer 76, should it require power.

As previously mentioned, the waves radiated by the transducer 76 may be either acoustic or electromagnetic. I find it, however, particularly advantageous to utilize ultra-high frequency electromagnetic waves since the pipe line 12 can be used as a dielectric guide of the type already known in the art as suitable for transmission of electromagnetic energy of ultra-high frequencies. For a description of dielectric wave guides, see, for instance, R. I. Sarbacher and W. A. Edson, "Hyper and Ultra High Frequency Engineering," John Wiley & Sons, Inc., 1943, New York, N.Y. The pipe line 12 is essentially a cylindrical wave guide of the sort described in chapter 7, pp. 228–290 of that book.

Figure 1B:
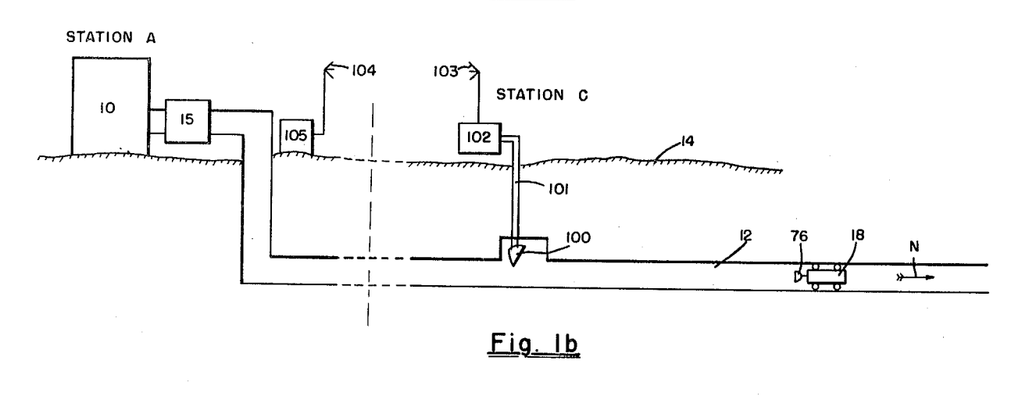
Fig. 1b shows a modified fragment of Fig. 1a in which the measurements of various conditions in pipe lines are transmitted by means of microwaves.

Thus ultra-high frequency waves may be radiated by the transducer 76, which in this case would be an electromagnetic horn or other suitable antenna, and may be guided by the pipe line to an UHF wave receiver 100 (Fig. 1b). An amplifier 102 is fed by the receiver 100 through leads 101, and its output is applied to the re-radiating UHF antenna 103 so as to re-radiate the signal picked up by the antenna 100. The amplifier 102 and the antenna 103 are located at the earth's surface at the position designated in Fig. 1b as the station C.

A plurality of such relay stations may be provided along the pipe line.

In an embodiment in which the transducer 76 radiates acoustical waves, those waves may be detected by an acoustical transducer 100, converted in the block 102 into UHF signals, and radiated from the antenna 103.

Thus, in both embodiments, the two signals respectively modulated by the outputs of the sensing elements 40 and 41 are transmitted as microwaves from the antenna 103 at the station C and are received by the short wave antenna 104 at the station A wherein they are recorded by element 105.

Figure 6:
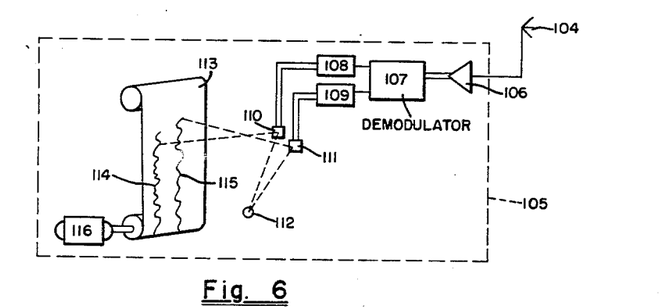
Fig. 6 shows diagrammatically the receiver of the "moving transmitter" system.

Fig. 6 shows diagrammatically the structure of the recorder designated by block 105 in Fig. 1b. In that unit, the two signals representing the outputs of the elements 40 and 41 are received by the antenna 104, are amplifier by amplifier 106, are detected by demodulator 107, and are fed to filters 108 and 109, the filter 108 being adapted selectively to transmit the signal representing the output of the sensing element 40, and the filter 109 being adapted to selectively transmit the signal representing the output of the sensing element 41. The output currents of the filters 108 and 109 are applied respectively to suitable coil-mirror assemblies 110 and 111 generally similar to the corresponding elements in Fig. 4, already described.

The lamp 112 throws beams of light to the galvanometer mirrors 110 and 111 which are respectively reflected onto a sensitized film 113 to produce thereon traces 114 and 115, representative of the current outputs of the elements 40 and 41. The film 113 is driven by a suitable clock mechanism 116.

The various components of the system above described for generating, transmitting, and receiving ultra-high frequency signals are of themselves well known in the art. References to the detailed description of such components can be found, for instance, in the above-referred to book by Sarbacher and Edson and in U.S. Patent 2,375,223, issued to W. W. Hansen et al.

I shall now describe various forms of the exploring element 40 for producing a signal which represents the variations of a definite physical condition occurring in the vicinity of the housing 18 as it travels through the pipe line.

Figure 7A:
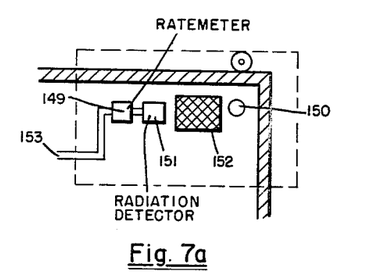
Fig. 7a shows a sensing element comprising a source of penetrating radiation and a detector of penetrating radiations.

One form of such exploring element is shown in Fig. 7a. It contains a source of neutrons 150 such as a radium-beryllium mixture and a gamma-ray detector 151, the detector and the neutron source being separated by a shield 152.

The source 150 emits neutrons into the earth formations surrounding the pipe and these neutrons undergo numerous collisions, as a result of which they are slowed down and eventually are captured by atoms in said formations. Upon capture, gamma rays are emitted, some of which are intercepted by detector 151, which may be of the Geiger-Muller type, producing across its output terminals a succession of voltage impulses at a rate proportional to the gamma-ray field strength.

The output of the detector 151 is applied to the rate meter 149. Across the output terminals 153 of said rate meter a D.-C. voltage appears which will be proportional to the strength of the gamma-ray field through which the exploring unit 18 is passing. The voltage derived from the output terminals 153 can be applied to leads 44 of the exploring housing shown in Fig. 3a or 3b or may be applied to modulate oscillator 70 in the embodiment of Figs. 5a and 5b.

As the exploring instrument 18 travels in the pipe line from A to B (Fig. 1a), the pipe and the surrounding formations are progressively irradiated by neutrons from the source 150. The effectiveness of the formations in capturing neutrons will vary along the pipe line, in accordance with changes in their composition, and the exploring instrument, as it travels in the pipe line, therefore detects varying quantities of gamma rays of capture. This results in a varying voltage across the terminals 153. Since the tendency of mineral formations to slow down and capture neutrons is primarily dependent on their hydrogen content, the voltage variation across terminals 153 may be said to indicate the variation in hydrogen content of the soil traversed by the exploring unit as it travels through the line.

As heretofore explained, the voltage across terminals 153 is recorded as a function of time, either within the unit on tape 48 or at a surface station with the apparatus of Fig. 6.

In order to correlate the record made by the exploring element 40 with the particular position along the pipe line at which each item of data is detected, I use the position-identifying element 41 which produces reference signals correlated with the positions of markers on the pipe line. Such markers are preferably the junctions between the pipe sections, such as collars 55, 56, 57, and 58. (Pipe lines normally consist of standard lengths of pipe joined by steel collars.) Since the effective wall thickness of the pipe line is greater at the collars than elsewhere, the movement of the exploring unit past a collar can be detected by a suitable magnetic device contained within the position-identifying element 41 and shown in Fig. 8a. This device consists of an exploring coil 160 in series with a resistor 161, a resistor 162, and a battery 163. The exploring coil is placed adjacent the wall 164 of the housing which is made of a non-magnetic material. The current passing through the exploring coil 160 produces a magnetic field extending outside the wall 164 and into the ferrous metal of the surrounding pipe 12. As the exploring element moves past a collar, the resulting change in effective pipe thickness introduces a transient voltage in the circuit which in turn causes a sudden change in the current passing through the resistor 162 and hence a change in the voltage across terminals 164. This voltage change is applied through the leads 45 to the recording head 47, or, in an exploring unit of the moving-transmitter type, is used to modulate oscillator 71.

When the exploring unit has completed its journey through the pipe line and the information recorded by the sensing elements 40 and 41 has been recorded on a film, by the apparatus of Fig. 4 or Fig. 6, as the case may be, the traces on the film constitute a continuous log of the hydrogen content of the formations surrounding the pipe line, correlated with the actual distance along the line from Station A to Station B, as indicated by the junction-collar signals recorded on the film.

Figure 9:
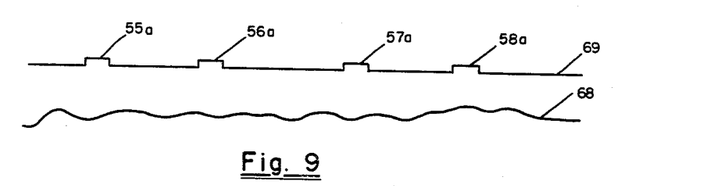
Fig. 9 indicates a typical graphic record obtained by sensing elements of the type illustrated in Figs. 7a and 8a under normal operation conditions.

The two traces 69 and 70 obtained on the film 68 or 113 for a typical exploring run are shown in some detail in Fig. 9. These traces represent normal operating conditions, i.e., with no leak in the pipe line. The trace 68 represents the intensity of the gamma rays intercepted by the detector 151, while the trace 69 represents the intensity of the signal obtained at terminals 164. The humps 55a, 56a, 57a, and 58a are the indications that the exploring unit 18 was passing through the junction collars 55 to 58, respectively.

The trace 68 is substantially uniform in amplitude under normal conditions, since the hydrogen content in the formations surrounding the pipe line does not normally vary much in the absence of a leak. When a leak develops, however, as at point L in Fig. 1a, a substantial concentration of fluid accumulates outside the pipe line in the neighborhood of the leak and as a result the sensing element 40 will detect in that region an increase in the number of gamma rays of capture. (Because of the high hydrogen content of oil or gas, the number of neutrons slowed down and captured will be greater in the vicinity of the leak.)

Figure 10:
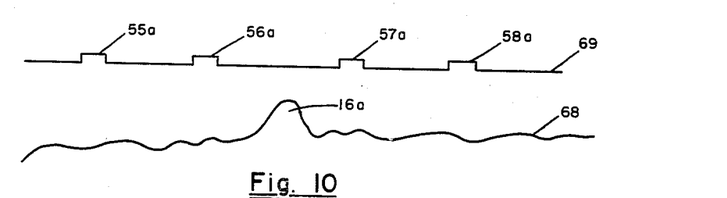
Fig. 10 indicates a typical graphic record obtained by sensing elements of the type illustrated in Figs. 7a and 8a in presence of a leak in the pipe line.

A typical record of exploring unit 18 traversing an area where a leak exists is shown in Fig. 10, wherein the leak is indicated by the hump 16a on the trace 68, showing a stronger gamma-ray field produced when the accumulated hydrocarbon fluid adjacent the leak is bombarded by neutrons from source 150.

It should be noted that the presence of the hydrocarbon concentration outside of the pipe line and in the neighborhood of the leak may produce a decrease in the recorded gamma-ray field intensity rather than an increase, depending upon the design of the exploring instrument and, among other things, the distance from the source 150 to the detector 151 and the nature and shape of the intervening shield 152. In all cases, however, the presence of a hydrocarbon accumulation outside a leak will produce an anomaly in the trace 68 which will reveal the whereabouts of the leak when taken in conjunction with the position-indicating trace 69.

In practicing the method of my invention, periodic inspections of pipe lines will be made to detect small leaks before they grow to serious proportions.

The method and apparatus of my invention may be used not only to locate leaks, but also for the routine exploration of the character of earth formation surrounding the pipe line. Thus an anomaly in trace 68 such as rise 16a may reveal an area along the pipe line where the water content of the formation is abnormally high. (Water, containing hydrogen, will affect the neutron-absorption rate much as will a concentration of oil.) Knowledge of the whereabouts of high water concentrations is important in pipe-line maintenance, since corrosion is likely to reach excessive proportions rapidly in such areas.

Figure 11:
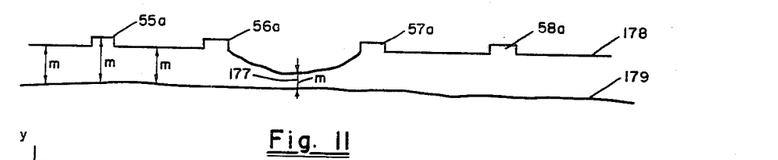
Fig. 11 is a similar showing of a record obtained by a sensing element of the type illustrated by 7b or a modified version of the type of Fig. 7a when a portion of the pipe line has been exposed to corrosion.

I may within my invention use sensing units adapted for obtaining a continuous record of the thickness of the pipe wall as the exploring housing 18 travels through the pipe line. Thus, in Fig. 7a, the device 150, instead of being a neutron source, may be a source of gamma radiation, such as radium or radioactive cobalt. The gamma rays emitted by the source 150 will penetrate the wall of the pipe line 12 and become thereby partly attenuated and partly scattered. Gamma-ray detector 151, being shielded from direct radiation from source 150 by lead shield 152, will respond only to gamma rays that have been scattered by the walls of the pipe line and thus deflected toward the detector. The quantity of rays scattered and intercepted by detector 151 will be proportional to the thickness of the pipe wall. Hence the record produced by the exploring unit will provide an indication of any zone in the pipe line in which the pipe wall has become thinner than normal as the result of corrosion. A typical record showing such a thin zone is shown in Fig. 11, where the thin zone is indicated by the portion of the trace marked 177.

Figure 7B:
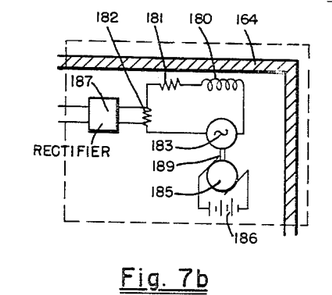
Fig. 7b shows a sensing element for detecting the magnetic characteristics of the surrounding medium.

The sensing device shown in Fig. 7b may be used to achieve a similar record. In that device an exploring coil 180 is connected in series with a resistor 181, a resistor 182, and an A.-C. generator 183. The A.-C. generator 183 is driven by a shaft 184 which is in turn driven by a D.-C. motor 185, the motor 185 being energized by battery 186. The coil 180 is placed adjacent the wall 164 of the housing which is made of a non-magnetic material.

The alternating current in exploring coil 180 produces an alternating magnetic flux which enters the pipe wall and is hence influenced by the wall thickness, the pipe being ferromagnetic. So long as the pipe thickness is uniform, the reluctance of the magnetic circuit will be substantially uniform and the voltage across resistor 182 will be likewise uniform.

When the exploring unit encounters a portion of the pipe line of different wall thickness, however, the magnitude of current flow will change, as a result of the change in reluctance, and the voltage across resistor 182 will change accordingly. The voltage will increase with an increase in wall thickness and conversely will decrease with a decrease in wall thickness.

The voltage across the output of the resistor 182 is applied to the rectifier 187. The D.-C. voltage thus produced across the output terminals of rectifier 187 indicates the thickness of the pipe wall being traversed by the exploring unit. Recording that D.C. voltage in any of the ways previously described will produce a record of the type shown in Fig. 11. A localized decrease in response such as designated by 177 on Fig. 11 points out a zone in which the wall is corroded and hence abnormally thin.

When my invention is being practiced in the manner now under discussion, the record typified by Fig. 11 will provide both information as to the pipe-line condition and information as to the location of abnormal conditions relative to the pipe junctions. The ordinate "$m$" represents the wall thickness at any given point. The humps 55a, 56a, etc. represent increased values of "$m$" produced when the unit passes through collars and thus serve as geographical reference points. Normally the value of "$m$" between collars is substantially uniform, but wherever the pipe wall has been thinned by corrosion the value of "$m$" will drop, as in the zone marked 177.

Thus a single record, in this form of the invention, provides all the required information for effective exploration of the pipe line.

Figure 8A:
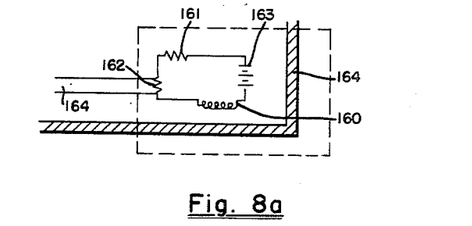
Fig. 8a shows diagrammatically and schematically a position identifying element for detecting collars or couplings along the pipe line.

The modes of operation of sensing element of Fig. 7b and that of Fig. 8a are broadly similar, in that both elements respond to variations in the magnetic permeance of the pipe-line wall. However, the exploring coil 160 in the element of Fig. 8a produces a D.-C. magnetic flux and hence the change in response produced by a variation in wall thickness is affected by the rate of motion of the exploring housing 18. Since this rate of motion is relatively slow, an element of the type shown in Fig. 8a will not effectively detect a gradual change in thickness, such as corrosion will normally produce, although it will readily detect the abrupt change in thickness characteristic of a junction collar. On the other hand, the response of the sensing element of Fig. 7b to a change in thickness does not depend on the rate of movement of the housing 18 through the pipe line, and therefore that device will dependably detect and point out changes in thickness resulting from corrosion even though the change may be very gradual, as at point 177 in Fig. 11.

If desired, the housing 18 can be constructed so as to rotate while it is moving along the pipe line. Structure for effecting such a rotary motion has been used, for instance, in pipe-line scrapers (see Oil Pipe Line Construction and Maintenance, vol. II, page 129, published February 1953 by the American Petroleum Institute, Division of Transportation). When the housing is thus given rotatory motion, the sensing element or elements will have a helical trajectory and the output of the sensing element will indicate the thickness of the pipe line along said trajectory.

In a pipe line the fluid pressure gradually decreases downstream from a pumping station. The normal variation of pressure along the pipe line 12 from station A to station B is represented diagrammatically in Fig. 12. Since a definite relationship exists between the fluid pressure and distance from the pumping station, it is possible to use a pressure-responsive device as position-determining element 41 to produce an electrical signal representing the value of the pressure encountered by the exploring housing 18 as it travels from the station A to B. Thus a record of the pressure such as Fig. 12 can be used instead of the record 69 of Fig. 9 or Fig. 10 for correlating the data provided by exploring device 40 with the positions along the pipe line wherein such data were obtained.

Figure 8B:
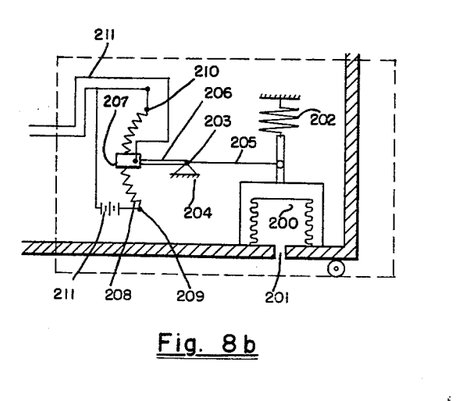
Fig. 8b shows a position identifying element for detecting the pressure at various points along the pipe line.

An embodiment of the position-identifying element 41 for producing such a record of pressure is shown in Fig. 8b. A bellows pressure gauge 200 is provided with an opening 201 to admit the pressure fluid in the pipe into the space inside the bellows. The force of the bellows is balanced against the compression spring 202, and the degree of compression of spring 202, and the degree of compression of spring 202 indicates the pressure in the fluid in the pipe line. As shown in Fig. 8b, the lever 203, fastened at the support 204, has one end 205 attached to the spring 202 and the other end 206 is provided with a slidable electrical contact member 207 adapted to move along the periphery of the resistor 208. The two terminals 209, 210 of resistor 208 are connected to a battery 211. Thus the voltage between the slidable contact 207 and the terminal 210 varies as the slidable contact 207 changes its position along the periphery of the resistor 208, and this voltage represents at any time the displacement of the bellows 200 under the effect of the pressure in the pipe fluid. The voltage across the terminals 207 and 210 is transmitted to the leads 211, and its value during the journey of the exploring unit through the pipe line may be recorded in any of the ways heretofore described.

Figure 7C:
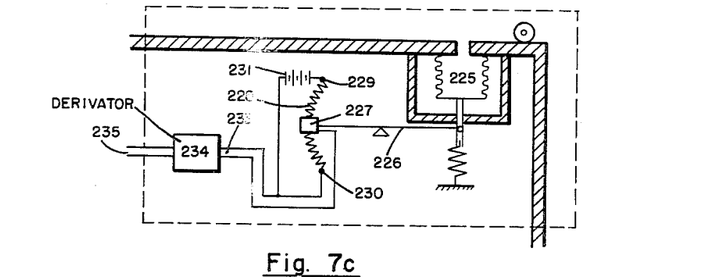
Fig. 7c shows a sensing element for detecting the derivative of pressure in the surrounding medium.
Figure 12:
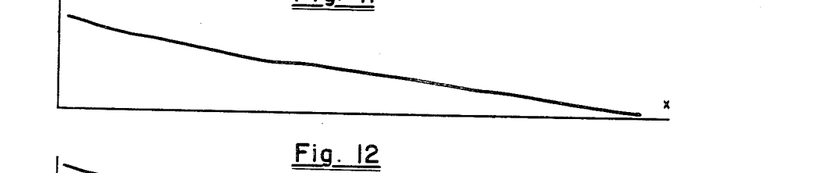
Fig. 12 shows the variation of pressure in the pipe line under normal operating conditions.
Figure 13A:
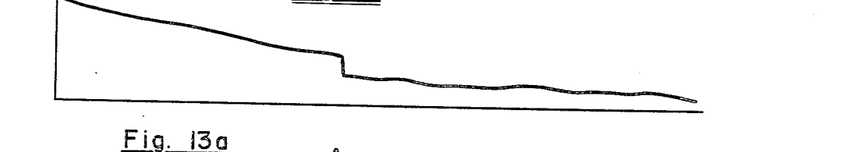
Fig. 13a shows variation of pressure in the pipe line in presence of a leak.
Figure 13B:
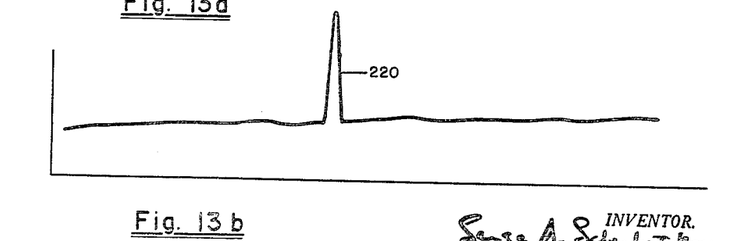
Fig. 13b shows the variation of the pressure gradient in the pipe line in presence of a leak.

The bellows-type pressure gauge shown in Fig. 8b as a part of the position-identifying device 41 can also be used as shown in Fig. 7c as a part of the exploring device 40. One purpose of exploring device 40, it will be recalled, is to produce a record indicative of leaks in the pipe line. Under normal operating conditions, i.e., in the absence of a leak, the pressure in the pipe line decreases gradually as shown in Fig. 12, but, if a leak develops, the pressure will show a discontinuity as in the neighborhood of the point L on Fig. 13a. A plot of the pressure gradient (i.e., the rate of change of pressure) will show, at the part of the record corresponding to point L, a hump such as that marked 220 on Fig. 13b.

An exploring element 40 that contains a means for producing a signal representing the pressure gradient within the pipe 12 is shown in Fig. 7c. Therein I show a bellows pressure gauge 225, similar to the one of Fig. 8b, adapted to move, by means of the lever 226, the sliding contact 227 along the periphery of the resistor 228. The two terminals 229, 230 of resistor 228 are connected to a battery 231. That voltage between the slidable contact 227 and the terminal 230 will vary with the motion of the bellows 225; hence the variation of this voltage represents the variation of pressure within the pipe line. Terminals 227 and 230 are connected through leads 233 to a derivator 234 adapted to produce across its output terminals 235 a voltage representing the rate of change of the pressure in the pipe line. Since the housing 18 will move in the pipe line at a substantially constant velocity, the output signal produced at terminals 235 will be proportional to the pressure gradient in the part of the pipe line through which the exploring unit is passing. This signal may be recorded in any of the ways already described.

Corrosion in a pipe line is always associated with the presence of electrical currents. These currents may be due to the galvanic-cell effects or voltaic-cell effects or oxygen-concentration effects.

Galvanic-cell currents may be due to some non-uniformity in the pipe composition, producing two dissimilar areas which are immersed in an electrolyte of ground water containing dissolved chemicals. This will produce a potential which will cause current to flow through the pipe between the dissimilar zones.

In other cases potentials may be produced by chemical differences in the moisture composition in different areas through which the pipe passes. This difference in composition may produce a difference of potential, and likewise a difference in oxygen concentration in separated areas of soil may create an electromotive force along the pipe.

Whatever the cause of the potential, the flow of current through the interface between the pipe and the soil produces corrosion of the metal.

Figure 7D:
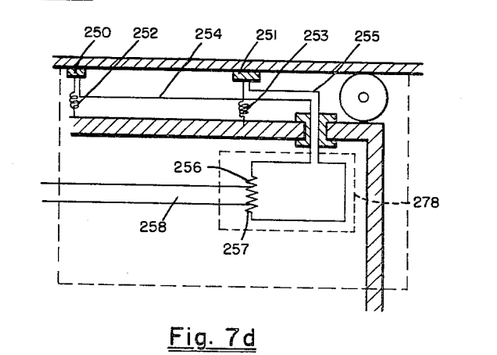
Fig. 7d shows a sensing element for detecting electrical currents that ars associated with corrosion.

The presence of conditions productive of corrosion can be detected by measuring the difference of potential between two electrodes adapted to slide along the inside wall of a pipe line. An exploring element for performing such measurement is shown in Fig. 7d.

In that figure, the exploring housing 18 is provided with two contact elements 250 and 251 positioned outside of the wall of the housing and pressed outwardly against the inner wall of the pipe line by means of springs 252 and 253. The contact elements 250 and 251 are connected by means of leads 254 and 255 to a circuit consisting of a resistor 256 in series with resistor 257, resistor 257 having its terminals connected to output leads 258.

As the exploring housing 18 travels within the pipe line, the difference of potential between the contact elements 250 and 251 is normally zero and consequently no current will flow through the resistors 256 and 257. Thus the voltage across the output leads 258 is zero. If, however, a current, indicative of corrosion, is flowing through the pipe, a potential will appear across the electrodes 250 and 251, and a voltage will appear across the output leads 258.

This output may be recorded in any of the ways previously described, and the record thus made will indicate the presence of corrosion-producing conditions within the line.

Figure 7E:
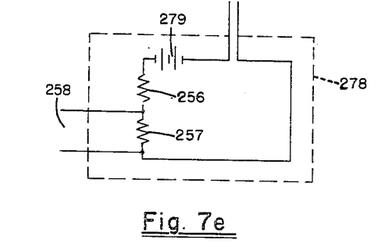
Fig. 7e shows schematically a modified fragment of Fig. 7d that is particularly adapted for performing certain electrical measurements within the pipe line.

Fig. 7e shows a modification of a portion of the arrangement shown in Fig. 7d, said portion being enclosed within the dotted rectangle 278. As shown in Fig. 7e, the circuit connected to the electrodes 250 and 251 comprises, in addition to the resistors 256 and 257, a voltage source 279. The current flowing through the resistor 257 will depend to a very large extent upon the resistivity of the earth's formation in the neighborhood of electrodes 250, 251 and also upon the voltage generated between these electrodes by the electrolytic earth currents due to corrosion. Thus changes in the voltage across the leads 258 will be indicative of conditions in the pipe line conducive to corrosion.

The presence of currents accompanying the various corrosion processes may also be detected by measuring the magnetic field produced in the line by the currents. This may be done by using an exploring housing of the type shown in Fig. 3a or Fig. 3b in which the block 40 designates a magnetometer of conventional type, adapted to produce across its output terminals 44 an electrical current representing the strength of the magnetic field within the pipe line.

Sometimes the inside wall of a pipe line is provided with a thin protective coating made of insulating material. In such instances an arrangement similar to the one shown in Fig. 7e may be used in order to discover breaches in the coating, such defects being known in the art as "holidays." In such an application, the electrodes 250 and 251 are normally insulated one from the other, and therefore no current normally flows through resistors 256 and 257 despite the presence of voltage source 279. When the contact electrodes bridge a defect in the coating, however, the insulation will break down and a current will flow through the resistor 257, producing a corresponding voltage across the leads 258. In this application, source 279 should provide a high potential—usually several thousand volts.

Figure 8C:
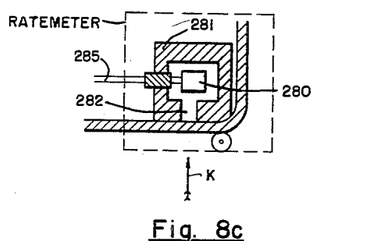
Fig. 8c shows a position identifying element for detecting the radioactive markers suitably distributed along the pipe line.

Another embodiment of a position-identifying element 41 is shown in Fig. 8c. It consists of a radiation detector 280, surrounded by a shield 281 adapted to absorb all incident radiation except that arriving in the upward direction along the arrow K through a suitable channel 282. Consequently, the detector is directional and is adapted to respond to the presence of radioactive markers suitably disposed along the pipe line. As shown in Fig. 1, such markers may consist of a series of radioactive capsules 35, 36, 37, 38, 59, each containing a small amount of radium or other radioactive material and being spaced approximately equidistantly along the pipe line.

As the exploring instrument 18 travels along the pipe line, the counter 280 will continuously receive gamma rays from the surrounding medium. When it passes in the immediate neighborhood of any of the reference capsules 35, 36, 37, 38, 59, however, it will receive a concentrated beam of gamma rays which will produce a strong voltage impulse across the terminals 285, which may be recorded as described and used to define the location of abnormal conditions detected by condition-sensing element 40.

When a sensing element 40 of the type shown in Fig. 7a is used, the capsules 35, 36, etc. may contain boron instead of radioactive material. Under those conditions the record produced by the sensing element 40 will give position as well as condition data, since passage of the exploring unit by a boron capsule will be marked by a sudden decrease in the output of the neutron detector 151, due to the neutron-absorbing power of the element boron.

In order to detect a leak in a pipe line, a soluble radioactive material may be introduced into the fluid and be allowed to accumulate outside the pipe line adjacent the leak. If the leak occurs at the point L as shown in Fig. 1a, an accumulation 16 of radioactive substance will occur adjacent point L. To detect and record the presence of such an accumulation 16, a sensing element of the type shown in Fig. 7f may be used. In that figure I show a radiation detector 290, which provides across its output terminals pulses having a rate of occurrence representative of the intensity of the gamma-ray field intercepted by the detector. Detector 290 is connected to a rate meter 291 which produces across its output terminals 292 a D.-C. voltage representing the frequency of pulses from detector 290.

Figure 7F:
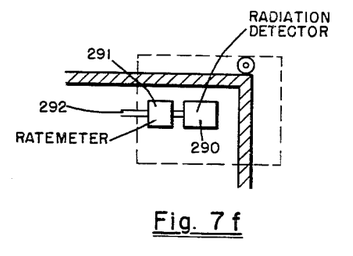
Fig. 7f shows a sensing element comprising a radiation counter.

In this form of my invention I introduce into the flowing stream a limited amount of a radioactive substance which shall be used as a tracer. This tracer will not diffuse appreciably into the flowing stream, but remains in relatively concentrated form and moves in the direction of the arrow W substantially at the same velocity as the stream. A certain time after the insertion of the tracer I introduce into the pipe line at the station A the exploring housing 18 which moves in the pipe line at the same velocity as the tracer and is maintained at a constant distance from the tracer. The housing 18 contains the radiation detector 290. In the absence of a leak in the line, the detector 290 will not receive any noticeable amount of radiation from the moving tracer material, which is far ahead of it. When, however, the exploring unit passes in the neighborhood of the point L at which the leak is present, the detector 290 will respond strongly to the tracer material which will have seeped through the leak into the fluid accumulation at region 16.

There are three general requirements desirable in a radioisotope to be used successfully as a tracer in pipe lines: (a) It should emit penetrating gamma rays; (b) it should have a half life at least comparable with the duration of its time of travel through the pipe line; (c) it should be present in a stable compound which will intermix readily with the products in the pipe line.

One isotope which meets these conditions is barium 140. This isotope has a half life of 12.8 days and emits beta rays and 0.5 mev. gamma rays. The product of disintegration is lanthalum-140 which also is radioactive, having a half life of forty hours and emitting gamma rays of 1.6 mev. It is the lanthalum gamma rays which contribute most to the detection of the tracer.

To make a tracer material suitable for use in a petroleum-product pipe line the radioactive barium may be converted to an oil-soluble compound, such as an alkyl phenate which can be dissolved in oil. The oil solution may be used as a tracer material.

The indications produced by the sensing unit of Fig. 7f may of course be recorded in any of the ways previously described. The result of such recording will be a graph similar to trace 68 in Fig. 9 or Fig. 10, in which leaks will be indicated by anomalies such as that marked 16a. Position correlation can be provided by using any of the sensing elements 41 which are described herein.

Figure 8D:
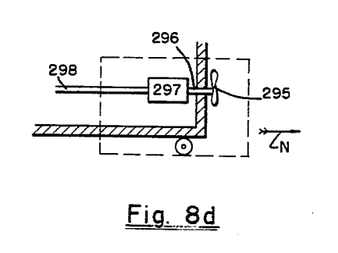
Fig. 8d shows a position identifying element that is actuated by a propeller.

Referring now more particularly to Fig. 8d, I provide in front of the housing 18 a propeller 295 adapted to rotate when the exploring housing moves in the direction of the arrow N. The speed of rotation of the propeller is proportional to the relative velocity of the housing 18 with respect to the fluid contained in the pipe. The shaft 296 driven by the propeller drives a suitable signal transducer 297 which generates at the leads 298 an electric pulse each time after completion of a predetermined number of revolutions of the shaft 296. These pulses are recorded on the tape 48 as shown in Figs. 3a and 3b for subsequent reproduction by means of the arrangement of Fig. 4, or, alternatively, the voltage impulses obtained at the leads 298 may be directly applied to the modulator 70 for reception at the station C and recordation by means of a recorder as shown in Fig. 6. A record similar to the one designated by 69 in Fig. 9 is thus obtained, characterized by a succession of humps similar to those designated by 55a to 58a. For any given velocity of the fluid flow in the pipe, the position of those impulses on trace 69 correspond to a particular position along the pipe line. Hence the apparatus of Fig. 8d represents another embodiment of sensing element 41.

Figure 8E:
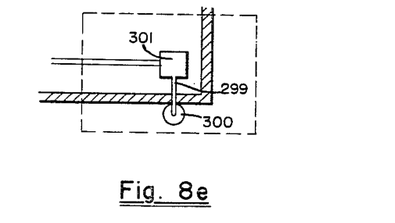
Fig. 8e shows a position identifying system that is actuated by a wheel.

Fig. 8e shows another embodiment of position-identifying element 41 in which the rotation of a shaft 299 driven by the wheel 300 is transmitted to a signal transducer 301 similar to the signal transducer 297 in Fig. 8d, i.e., it produces a pulse after each predetermined number of revolutions of the shaft 299. The wheel 300 is frictionally engaged to the inner wall of the pipe line 12, so that the forward motion of the exploring housing 18 causes the wheel to rotate. A record of the output pulses from the transducer 301 is made in the same manner as described with respect to transducer 297, likewise corresponding to the trace 69 in Fig. 9. On that trace the intervals between the humps 55a to 58a represent definite distances traveled by the exploring housing 18; hence the positions of those humps correspond to determined positions along the pipe line.

In using the methods of my invention to locate leaks, it is sometimes advisable to increase the pressure in the pipe line through the leaking section, in order to obtain a maximum concentration of fluid in the soil adjacent the leak.

The methods of my invention for detecting leaks in pipe lines are so simple in application that they can be readily used by the regular pipe-line operators, and the sensitivity of my methods are such that relatively small leaks can be detected before the loss of fluid becomes excessive.

Figures 14A, 14B:
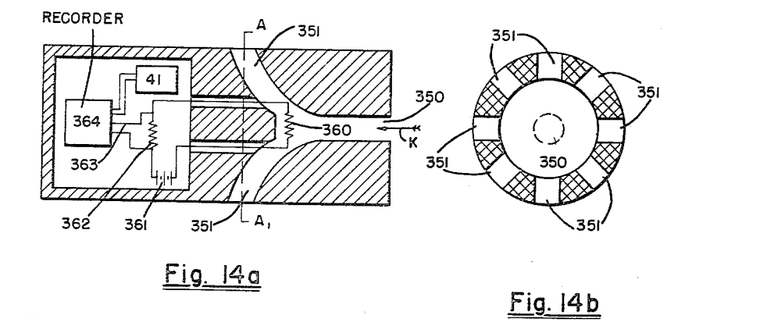
Fig. 14a shows an embodiment of my invention for determining the radial component in the fluid flow in the pipe line.
Fig. 14b shows a view of the section of the embodiment of Fig. 14a along the plane A—A$^1$.

As shown in Fig. 1a the fluid in the pipe line flows progressively in the direction of the arrow N, so that, under normal operating conditions, the direction of fluid flow is wholly axial. There is no radial flow since the component of the mean fluid velocity along the direction perpendicular to the axis of the pipe line is zero. In the presence of a leak, however, a portion of the fluid normally flowing in the direction of the arrow N will be diverted through the leak into the region 16 outside of the pipe line. This produces within the pipe line a radial component of fluid velocity in the neighborhood of the leak. Fig. 14a and Fig. 14b show a sensing element 40 for detecting leaks by indicating the presence of such a radial component of fluid flow. In Figs. 14a and 14b the exploring housing 18 is provided with a channel having its input section 350 aligned along the axis of the pipe line and having a plurality of output sections 351 extending radially from the end of the input section and terminating externally of the housing.

Under normal operating conditions, the progressive motion of the housing 18 in the direction of the arrow N causes a corresponding motion of the fluid contained in the pipe line. The motion of the fluid is represented by the arrow K. It is noted that the radial component of the velocity of the fluid along the channels 350 and 351 is relatively slow and is determined primarily by the motion of the instrument housing. Assume now, however, that a leak develops in the pipe line at point L and consider the instant at which the position of the housing is such that the opening of one of the radial channels 351 is directly opposite to the leak L. Due to the high pressure existing in the pipe line, a portion of the fluid will escape from the pipe line through the channel 351 and the leak L, causing a considerable increase in the radial velocity of fluid flow through the channel 350.

As shown in Fig. 14a I provide within the channels 350, 351 a resistor 360 which is supplied by a current through a battery 361 in series with a resistor 362. The resistor 360 is of the temperature-dependent type, the resistance of which varies as the temperature changes. Hence the quantity of current flowing through resistor 360 will depend to a great extent on the velocity of flow of liquid. If this velocity is high, the cooling of the resistor is relatively effective and the resistance is low; conversely, if the velocity is low the cooling is less effective, and the resistance is relatively high.

Hence the current through resistors 360 and 362, and consequently the voltage across the output terminals 363, will vary in accordance with the velocity of the fluid flow through the channels 350, 351.

Under normal operating conditions, the velocity of fluid flow in the channels 350, 351 is relatively slow and consequently the voltage across the leads 363 is relatively small. However, if a leak develops such as the one shown at point L, the velocity of flow increases when the instrument housing passes in the neighborhood of the leak, and this increase produces an increase in the voltage across the leads 363.

The voltage across terminals 363 may be recorded in any of the ways described herein.

Figure 15A:
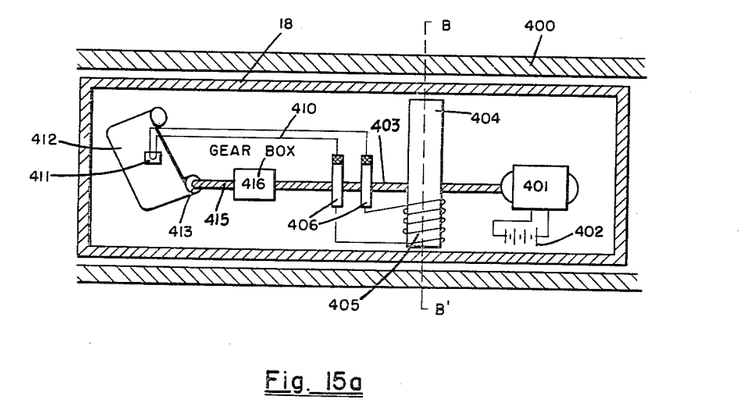
Fig. 15a shows diagrammatically an embodiment of my invention for the magnetic inspection of the walls of the pipe line.
Figure 15B:
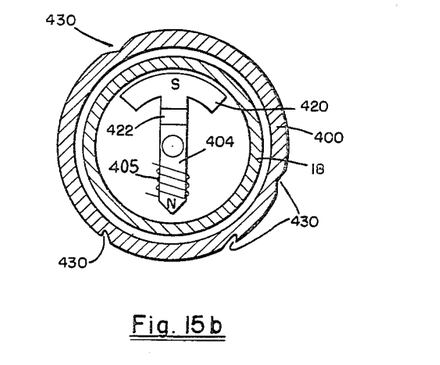
Fig. 15b shows a view of the section of the embodiment of Fig. 15a along the plane B—B$^1$.

Fig. 15a and Fig. 15b show another embodiment of sensing element 40 for magnetic inspection of pipe lines. In those figures, 400 designates the wall of the pipe 12. Arranged inside the pipe is the housing 18, constructed of a thin-walled non-magnetic material. Suitably mounted in the housing is an electric motor 401 driven by batteries 402. The shaft 403 of the motor carries at its free end a magnetic scanner 404 on which is wound a coil 405, the ends of which are connected through slip rings 406 via conductors 410 to a magnetic recording head 411. The recording head 411 is adapted to produce magnetic impressions on the magnetizable tape 412, which is moved past the head 411 by the spool 413. The spool 413 is driven by motor 401 via the gear box 416, which acts as a speed reduced.

As shown in Fig. 15b the shaft 403 of the motor carries a T-shaped member, the cross portion 420 of which is arcuate in shape to conform to the shape of the interior of the pipe. This cross member is composed of soft iron or other magnetic material and constitutes the south pole of the magnet. The free end 42 of the leg of the T is also composed of soft iron or other magnetic material. This free end constitutes the north pole of the magnet and terminates a short distance away from the wall of the housing. This means, of course, that the whole T-shaped member fits snugly in the housing 18 which in turn is of cross-sectional area closely approximating that of the interior of the pipe 12.

Between the two pieces of the soft iron there is interposed a strong permanent magnet 422. The coil 405 is wound around the north pole of the assembly in the manner shown in Fig. 15b.

As the housing 18 moves within the pipe line 12 under the force of the liquid stream, the magnetic element 404 is continuously rotated, setting up a rotating magnetic field in the surrounding space, including the wall of the pipe line. The coil 405 is in this magnetic field. Where the casing is deformed as by pits 430 due to corrosion, the magnetic field is modified. The changing in intensity of the magnetic field sets up an induced electromotive force in the coil 405 which is applied through the leads 410 to the movable magnetizable tape 412 and the record thus obtained may be reproduced by means of the arrangement shown in Fig. 4. Alternatively, the voltage across the leads 410 may be connected to a wave signal and transmitted back to a central station for recording, as heretofore described.

This sensing element will yield a record of the general type shown in Fig. 11, wherein the junction casings will be indicated by humps on the trace 178 and areas of corrosion, and hence decreased thickness, will be shown by zones of decreased response, such as zone 177.

I have in this specification described a number of different embodiments by means of which my invention may be practiced. It is to be understood that those embodiments are illustrative only, and that persons skilled in the art may introduce many changes and modifications in the embodiments shown without departing from the spirit of my invention.

I claim:

1. A method of exploring a pipe line through which fluid is flowing comprising the steps of introducing into the line a carrier adapted to be moved by the force of said fluid and thus to travel through said pipe line, producing in said carrier signals representing the rate of change in fluid pressure within said pipe line during the course of travel of said carrier, producing in said carrier other signals representing the successive passage by said carrier of a plurality of predetermined definite positions in said line, and recording said first signals in correlation with said second signals.

2. In combination with a pipe line carrying fluid from point to point, an exploring unit adapted to be inserted in said pipe line and to be carried freely therethrough responsively to the force of said fluid and thereby to travel within said pipe line from point to point, said exploring unit comprising a pressure-sensitive element for producing a signal representing continuously the rate of change of pressure existing in the fluid progressively surrounding said unit while it travels through said pipe line, and means for recording said signal while said unit is moving in said pipe line.

3. The method of exploring a pipe line through which fluid is flowing, said pipe line being characterized by spaced discontinuities of known location, comprising the steps of introducing into the line a carrier adapted to be moved by the force of said fluid and thus to travel through said pipe line, producing in said carrier signals representing the successive values of rate of change of fluid pressure within said pipe line encountered by said carrier during the course of its travel therethrough, producing in said carrier other signals indicative of the passage of said carrier past said discontinuities, and correlatively recording said first-mentioned signals and said other signals while said carrier is traveling through said pipe line.

4. In combination with a pipe line carrying fluid from point to point, an exploring unit adapted to be inserted in said pipe line and to be carried freely therethrough responsively to the force of said fluid and thereby to travel within said pipe line from point to point, said exploring unit comprising: a pressure-sensitive element for producing a signal continuously representative of the value of pressure within said fluid in the vincinity of said unit, derivator means fed by said signal operative to develop a signal representing the rate of change of fluid pressure encountered by said unit in its travel through said line, means for producing another signal representing the value of another physical condition existing in the space region surrounding said unit, and other means within said unit for correlatively recording said rate-of-change signal and said other signal while said unit is traveling through said pipe line.

5. In combination with a pipe line carrying fluid from point to point, said pipe line being characterized by spaced discontinuities of known location, an exploring unit adapted to be inserted in said pipe line and to be carried freely therethrough responsively to the force of said fluid, said exploring unit comprising a pressure-sensitive element for producing a signal continuously representative of the value of fluid pressure in the vicinity of said unit, derivator means fed by said signal operative to develop a signal representing the rate of change of fluid pressure encountered by said unit in its travel through said pipe line, means within said unit operative to produce therein another signal indicative of the passage of said unit past said discontinuities, and means fed by said rate-of-change signal and said discontinuity-indicating signal operative to correlatively record said last-mentioned signals while said unit is travelling within said pipe line.

References Cited in the file of this patent

UNITED STATES PATENTS

| | | |
|---|---|---|
| 2,371,628 | Krasnow | Mar. 20, 1945 |
| 2,507,351 | Scherbatskoy | May 9, 1950 |
| 2,601,248 | Brenholdt | June 24, 1952 |
| 2,737,595 | Schberbatskoy | Mar. 6, 1956 |
| 2,782,370 | Nooy | Feb. 19, 1957 |
| 2,793,524 | Badger | May 28, 1957 |